US012252833B2

(12) United States Patent
Wu

(10) Patent No.: US 12,252,833 B2

(45) Date of Patent: Mar. 18, 2025

(54) WASHING POWDER FEEDING DEVICE AND FEEDING METHOD THEREOF

(71) Applicant: Dongguan Fengyi Instrument Co., Ltd, Guangdong (CN)

(72) Inventor: Xumin Wu, Guangdong (CN)

(73) Assignee: DONGGUAN FENGYI INSTRUMENT CO., LTD, Dongguan (CN)

( * ) Notice: Subject to any disclaimer, the term of this patent is extended or adjusted under 35 U.S.C. 154(b) by 730 days.

(21) Appl. No.: 17/515,724

(22) Filed: Nov. 1, 2021

(65) Prior Publication Data

US 2022/0205162 A1 Jun. 30, 2022

(30) Foreign Application Priority Data

Dec. 28, 2020 (CN) ......................... 202011585043.2
Dec. 28, 2020 (CN) ......................... 202011587508.8

(51) Int. Cl.

*D06F 39/02* (2006.01)
*B01F 21/20* (2022.01)
*B01F 25/10* (2022.01)
*B01F 101/00* (2022.01)

(52) U.S. Cl.

CPC .............. *D06F 39/02* (2013.01); *B01F 21/20* (2022.01); *B01F 25/10* (2022.01); *B01F 2101/4505* (2022.01)

(58) Field of Classification Search

CPC .......... D06F 39/02; B01F 21/20; B01F 25/10; B01F 2101/4505

See application file for complete search history.

(56) References Cited

FOREIGN PATENT DOCUMENTS

| | | | |
|---|---|---|---|
| CN | 104947381 | A | 9/2015 |
| CN | 205012053 | U | 2/2016 |
| CN | 205557107 | U | 9/2016 |
| CN | 105986418 | A | 10/2016 |
| CN | 106319873 | A | 1/2017 |
| CN | 106958123 | A | 7/2017 |
| CN | 107237089 | A | 10/2017 |
| CN | 108385335 | A | 8/2018 |
| GB | 2157716 | A | 10/1985 |
| JP | H01313090 | A | 12/1989 |
| WO | 2019221462 | A1 | 11/2019 |

OTHER PUBLICATIONS

WO2019221462A1 Machine Translation (Year: 2019).*
JPH01313090A Machine Translation (Year: 1989).*

* cited by examiner

*Primary Examiner* — Anshu Bhatia
(74) *Attorney, Agent, or Firm* — SHIMOKAJI IP

(57) ABSTRACT

A washing powder feeding device includes a frame, a water pipe, a powder feeding mechanism and a vortex tube body respectively assembled on the frame. The vortex tube body is defined with a first cylindrical cavity, an intermediate truncated cone cavity and a second cylindrical cavity from top to bottom, the first cylindrical cavity has a larger diameter than the second cylindrical cavity, a water inlet is formed on a side wall of the vortex tube body and communicated with and tangent to the first cylindrical cavity, the water pipe is communicated with the water inlet, and the powder feeding mechanism is configured to feed washing powder into the first cylindrical cavity. The device can effectively prevent the dissolved washing powder from adhering onto the pipeline to cause clogging of the pipeline, thereby ensuring the washing reliability.

17 Claims, 9 Drawing Sheets

WASHING POWDER FEEDING DEVICE AND FEEDING METHOD THEREOF

FIELD OF THE INVENTION

The invention relates to the field of cloth washing detection, in particular to a washing powder feeding device used for feeding washing powder into a washing machine in a cloth washing test and a feeding method thereof.

BACKGROUND OF THE INVENTION

With the continuous development of the economy and the continuous progress of society, a variety of material consumer goods are provided for people's lives, and clothing is one of many material consumer goods.

As well known, various tests are required on the fabric of the clothing before the clothing is put on the market, so as to meet the standard requirements set by the industry.

During the cloth washing test, washing powder addition steps are indispensable, and multiple washing and multiple washing powder additions are involved.

However, the existing operation of adding washing powder to the washing machine is generally done manually by the experimenter, so the efficiency is low and the burden of the experimenter is increased. An automatic powder feeding device to the washing machine has also appeared on the market, however such an automatic powder feeding device at this stage is deficient, the dissolved washing powder is easily adhered onto the pipeline due to its viscosity, which causes clogging of the pipeline and affects the subsequent washing process.

Therefore, there is an urgent need for a washing powder feeding device to overcome the above-mentioned shortcomings

SUMMARY OF THE INVENTION

One objective of the present invention is to provide a washing powder feeding device, which can effectively prevent the dissolved washing powder from adhering onto the pipeline to cause clogging of the pipeline, thereby ensuring the washing reliability.

Another objective of the present invention is to provide a washing powder feeding method, which can effectively prevent the dissolved washing powder from adhering onto the pipeline to cause clogging of the pipeline, thereby ensuring the washing reliability.

To achieve the above-mentioned objectives, the present invention provides a washing powder feeding device comprising a frame, a water pipe, a powder feeding mechanism and a vortex tube body respectively assembled on the frame, wherein an interior of the vortex tube body is defined with a first cylindrical cavity, an intermediate truncated cone cavity and a second cylindrical cavity from top to bottom, the first cylindrical cavity has a larger diameter than the second cylindrical cavity, a water inlet is formed on a side wall of the vortex tube body and communicated with and tangent to the first cylindrical cavity, the water pipe is communicated with the water inlet, and the powder feeding mechanism is configured to feed washing powder into the first cylindrical cavity.

Preferably, a pipe connector is horizontally extended from and tangent to the side wall of the vortex tube body, and the pipe connector is assembled and connected with the water pipe.

Preferably, center lines of the first cylindrical cavity, the intermediate truncated cone cavity, and the second cylindrical cavity coincide.

Preferably, the frame is a box structure in which the powder feeding mechanism, the vortex tube body and the water pipe are configured, one end of the water pipe is horizontally extended from the box structure, and the second cylindrical cavity of the vortex tube body is connected with a mixed flow pipe arranged in a vertical direction, which is extended from the bottom of the box structure.

Preferably, the device further includes a water pipe control valve built into the box structure and an interface located outside the box structure, wherein the interface is also assembled and connected with the box structure, and the water pipe control valve is configured to control the water pipe to open or close.

Preferably, the powder feeding mechanism comprising a feed bin, a feeding screw, a stirring gear, and a drive motor for driving the feeding screw to rotate, the feeding screw is located in the feed bin, and a first end of the feeding screw is extended toward a powder outlet of the feed bin, the powder outlet is communicated with the first cylindrical cavity, a second end of the feeding screw is extended out of the feed bin, and the drive motor is located outside of the fee bin and assembled with the second end of the feeding screw, the stirring gear is rotatably installed in the feed bin and located directly above the feeding screw to engage with the feeding screw.

Preferably, a powder outlet pipe connector is protruded from a lower side wall of the feed bin and communicated with an interior of the feed bin, in which the powder outlet is formed, and the first end of the feeding screw is located in the powder outlet pipe connector.

Preferably, the second end of the feeding screw is mated with an output end of the drive motor in an insertion manner.

Preferably, one of the second end of the feeding screw and the output end of the drive motor is provided with convex teeth arranged at intervals in a circumferential direction, and the other of the second end of the feeding screw and the output end of the drive motor is provided with grooves that cooperate with the convex teeth.

Preferably, the powder feeding mechanism further comprises an electromagnetic control valve and an L-shaped bent pipe connector, a first end of the bent pipe connector is sleeved on the powder outlet pipe connector, and a second end of the bent pipe connector is arranged downward to extend to the first cylindrical cavity, the electromagnetic control valve is installed at the second end of the bent pipe connector and extended into the powder outlet pipe connector along an axial direction of the feeding screw, and the electromagnetic control valve is configured to selectively open or close the powder outlet.

In comparison with the prior art, the interior of the vortex tube body of the present invention is defined with a first cylindrical cavity, an intermediate truncated cone cavity, and a second cylindrical cavity from top to bottom, the first cylindrical cavity has a larger diameter than the second cylindrical cavity, and a water inlet is formed on a side wall of the vortex tube body and communicated with and tangent to the first cylindrical cavity, the water pipe is communicated with the water inlet. Based on the current configuration, a vortex will be formed inside the vortex tube body. During the feeding process of the washing powder, water flows through the water inlet and then flow into the first cylindrical cavity in a tangent direction, additionally since the first cylindrical cavity has a larger diameter than the second cylindrical cavity, therefore the water forms a vortex in the vortex tube body, and then the washing powder is fed into and the first cylindrical cavity and then stirred and taken away under the action of the vortex, which effectively prevents the dissolved washing powder from adhering onto the pipeline to cause clogging of the pipeline, thereby ensuring the washing reliability. In addition, the washing powder feeding device of the present invention has simple structure.

Accordingly, the present invention provides a washing powder feeding method, including steps of:

(1) providing a vortex tube body;

(2) flowing water into the vortex tube body along a direction tangent to an inner wall of the vortex tube body, to form a vortex flow in the vortex tube body; and (3) adding a quantitative of washing powder to the vortex tube body, so that the quantitative amount of washing powder is stirred and taken away under an action of the vortex flow, and finally flows into the washing machine.

Preferably, an interior of the vortex tube body is defined with a first cylindrical cavity, an intermediate truncated cone cavity and a second cylindrical cavity from top to bottom, the first cylindrical cavity has a larger diameter than the second cylindrical cavity, a water inlet is formed on a side wall of the vortex tube body and communicated with and tangent to the first cylindrical cavity, the water flows into the first cylindrical cavity along a direction tangent to a cavity wall of the first cylindrical cavity to form a vortex flow in the vortex tube body, under a cooperation of the intermediate truncated cone cavity and the second cylindrical cavity.

Preferably, in the step (3), a powder feeding mechanism is configured to add the quantitative amount of washing powder to vortex tube body.

Preferably, the powder feeding mechanism is further configured to stir the washing powder while adding the washing powder.

Preferably, the powder feeding mechanism comprises a feeding screw and a drive motor for rotating the feeding screw in a stepwise manner to add the washing powder.

Preferably, the powder feeding mechanism further comprises a stirring gear for stirring the washing powder.

Preferably, the feeding screw is engaged with stirring gear and configured to rotate in a stepwise manner and meanwhile drive the stirring gear.

Preferably, a controller and an interface are configured and cooperated to set a working mode of the drive motor.

In comparison with the prior art, the water flows into the vortex tube body in a direction tangent to the inner wall of the vortex tube body, to form a vortex the vortex tube body, and then a quantitative amount of washing powder is added to the vortex tube body and then is stirred and taken away into the washing machine under the action of the vortex. By this token, under the strong pulling force of the vortex, the quantitative washing powder added to the vortex tube body is fully stirred and flows into the washing machine, which effectively prevents the added washing powder from clogging the pipeline due to the viscosity of the washing powder when it is mixed with water, thereby ensuring the reliability of washing.

BRIEF DESCRIPTION OF THE DRAWINGS

FIG. 8 is another exploded perspective view of the powder feeding mechanism shown in FIG. 6 a;

DETAILED DESCRIPTION OF ILLUSTRATED EMBODIMENTS

Figure 1:
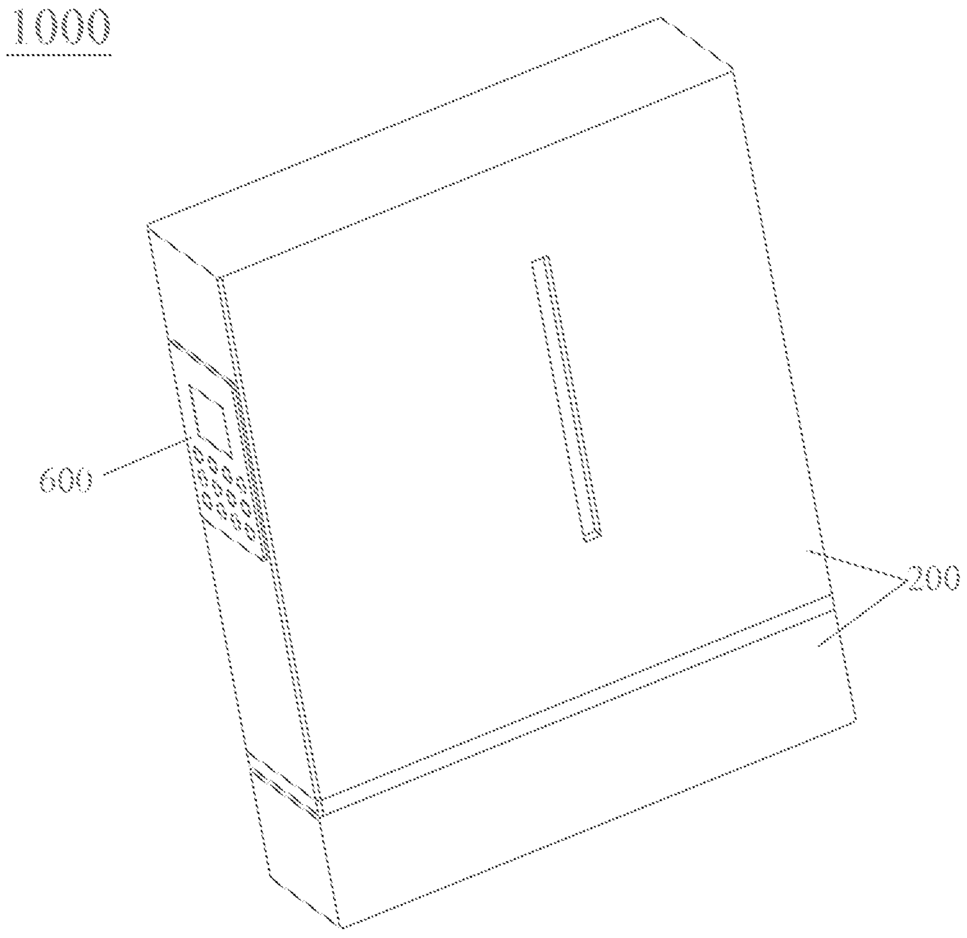
FIG. 1 is a perspective view of a washing powder feeding device according to one embodiment of the present invention.

In order to describe the technical solution and structural features of the present invention in detail, the following description will be made in conjunction with the embodiments and the accompanying drawings.

Referring to FIGS. 1 to 5, a washing powder feeding device 1000 according to the present invention include a frame 200, a water pipe 300, a powder feeding mechanism 100 and a vortex tube body 400 respectively assembled on the frame 20. An interior of the vortex tube body 400 is defined with a first cylindrical cavity 410, an intermediate truncated cone cavity 420 and a second cylindrical cavity 430 from top to bottom. Specifically, the diameter D1 of the first cylindrical cavity 410 is a larger than the diameter D2 of the second cylindrical cavity 430. Preferably, the center lines C of the first cylindrical cavity 410, the intermediate truncated cone cavity 420, and the second cylindrical cavity 430 coincide, which facilitates the processing and manufacturing of the interior of the vortex tube body 400. Of course, the center lines of the first cylindrical cavity 410, the intermediate truncated cone cavity 420, and the second cylindrical cavity 430 can also be misaligned, which depends on actual needs and is not limited. A water inlet 450 is formed on a side wall 440 of the vortex tube body 400 and communicated with the first cylindrical cavity 410, and further the water inlet 450 is tangent to the cavity wall 411 of the first cylindrical cavity 410, so that water from the water inlet 450 can flow into the first cylindrical cavity 410 along a direction tangent to the cavity wall 411 of the first cylindrical cavity 410. The water pipe 300 is communicated with the water inlet 450, whereby water may be introduced. The powder feeding mechanism 100 is configured to feed powders into the first cylindrical cavity 410. Specifically, in FIGS. 2 and 5, a pipe connector 460 is horizontally extended from and tangent to the side wall 440 of the vortex tube body 400, and the pipe connector 460 is assembled and connected with the water pipe 300, which facilitates the assembly connection between the vortex tube body 400 and the water pipe 300.

Figure 2:
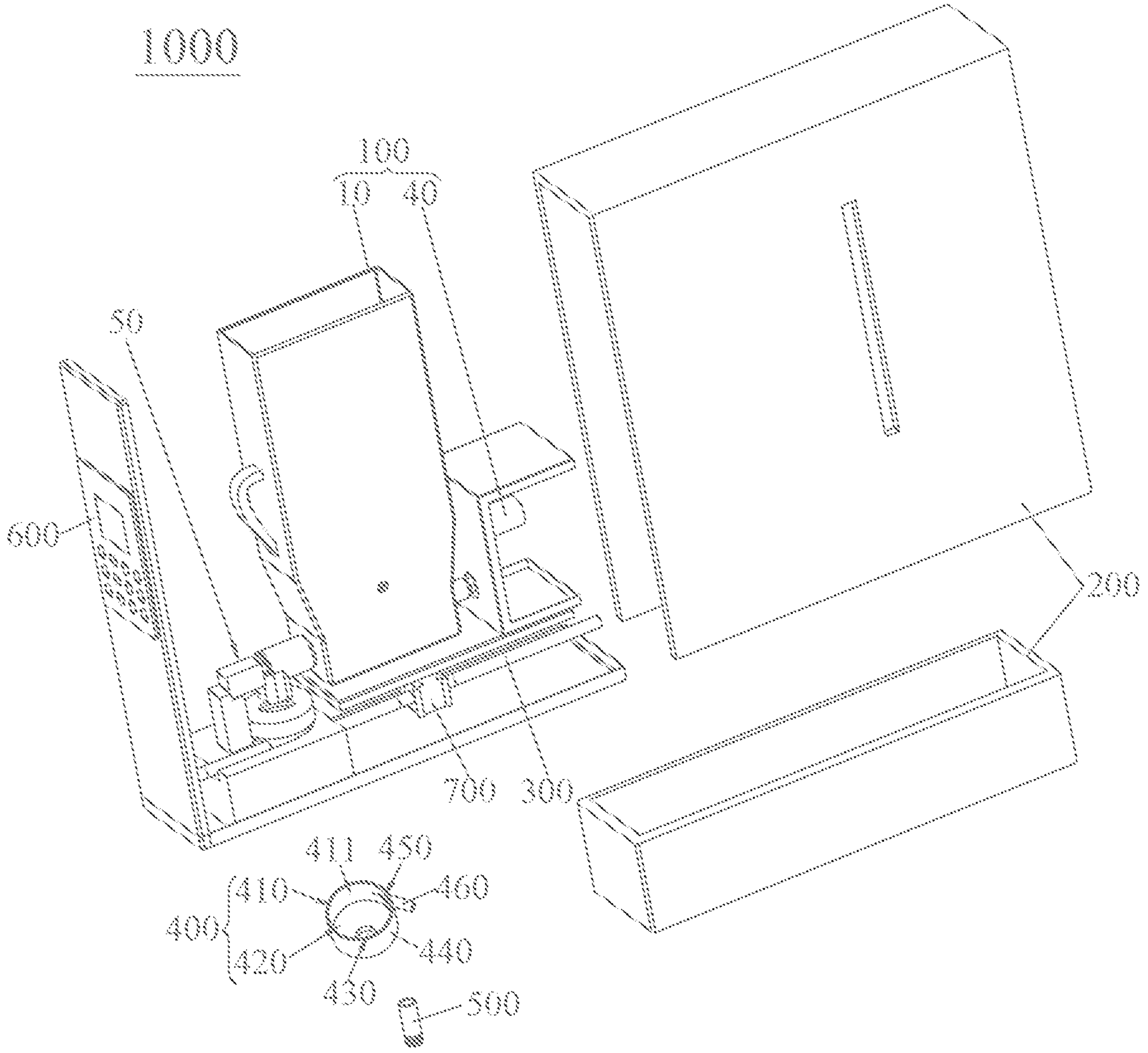
FIG. 2 is an exploded perspective view of the washing powder feeding device shown in FIG. 1.
Figure 3:
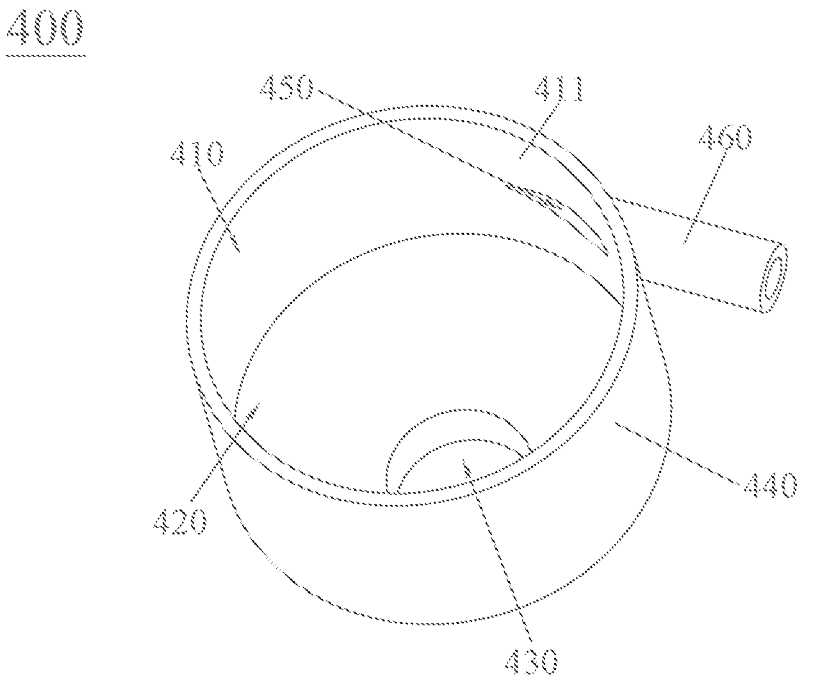
FIG. 3 is a perspective view of the vortex tube body in the washing powder feeding device according to one embodiment of the present invention.

More specifically, as shown in FIGS. 1-2, the frame 200 is a box structure in which the powder feeding mechanism 100, the vortex tube body 400 and the water pipe 300 are configured. One end of the water pipe 300 is horizontally extended out of the box structure to connect with an external water pipe, and the second cylindrical cavity 430 of the vortex tube body 400 is connected with a mixed flow pipe 500 arranged in a vertical direction, which is extended from the bottom of the box structure 200 to connect with a washing machine. The profile of the washing powder feeding machine 1000 of the present invention is more concise due to a box structure of the frame 200. Preferably, the washing powder feeding machine 1000 further includes a water pipe control valve 700 built into the box structure and an interface 600 located outside the box structure, the interface 600 is also assembled and connected with the box structure, and the water pipe control valve 700 is configured to control the water pipe 300 to open or close, thereby controlling the water supply from the water pipe 300 to the vortex tube body 400.

Referring to FIGS. 5-8, the powder feeding mechanism 100 includes a feed bin 10, a feeding screw 20, a stirring gear 30, and a drive motor 40 for driving the feeding screw 20 to rotate. The feeding screw 20 is located in the feed bin 10, and a first end 21 of the feeding screw 20 is extended toward a powder outlet 11 of the feed bin 10, the powder outlet 11 is communicated with the first cylindrical cavity 410, a second end 22 of the feeding screw 20 passes through the feed bin 10, thereby facilitating the assembly between the feeding screw 20 and the drive motor 40. The stirring gear 30 is rotatably installed in the feed bin 10 and located directly above the feeding screw 20 to engage with the feeding screw 20. Therefore, while the feeding screw 20 rotates, the rotating feeding screw 20 also drives the stirring gear 30 to rotate, so as to achieve the synchronous and coordinated rotation of the both. It should be noted that since the second end 22 of the feeding screw 20 passes through the feed bin 10 and is assembled and connected with the drive motor 40, therefore it's necessary to seal the second end 22 of the feeding screw 20 and the feed bin 10. For example, a sealing rubber ring may be arranged on the second end 22, and tightly clamped between the second end 22 and the feed bin 10 to achieve the purpose of sealing. When the driving motor 40 drives the feeding screw 20 to rotate, the rotating feeding screw 20 also drives the stirring gear 30 to rotate, and the washing powder in the feed bin 10 becomes even and looser due to the stirring gear 30, which benefits the accurate and reliable controls of the feeding amount of the washing powder.

Figure 7:
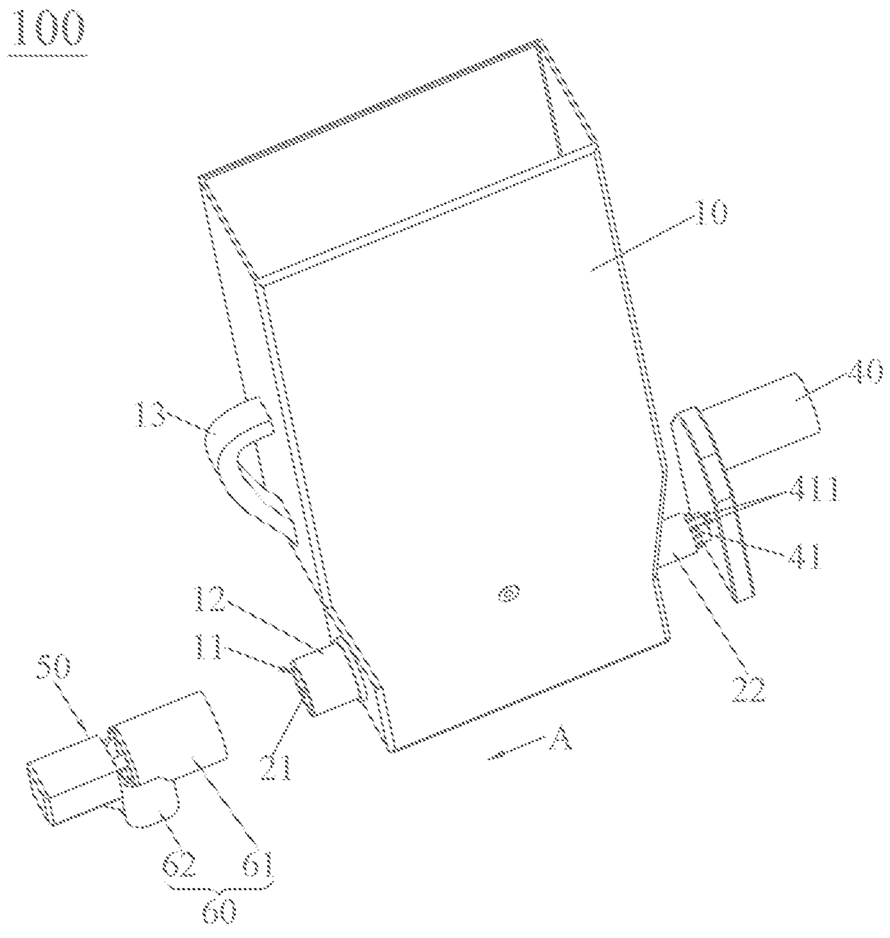
FIG. 7 is an exploded perspective view of the powder feeding mechanism shown in FIG. 6.
Figure 8:
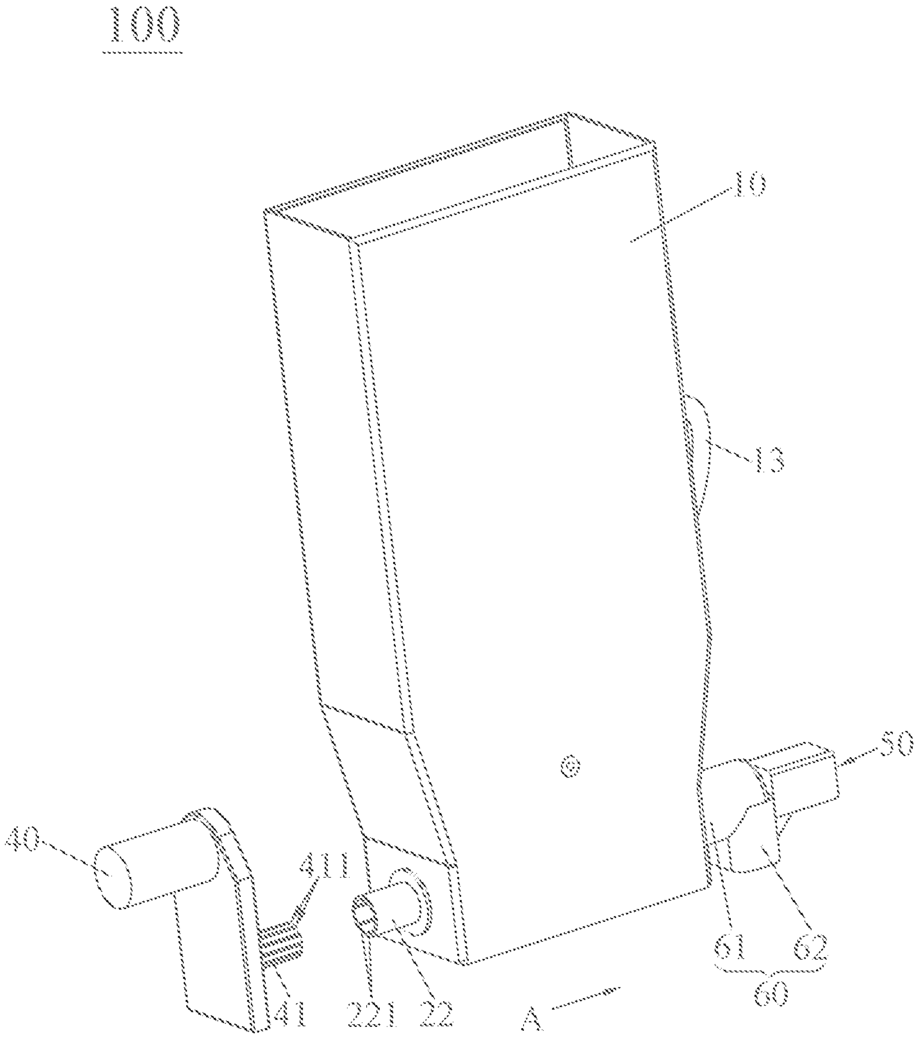
Figure 9:
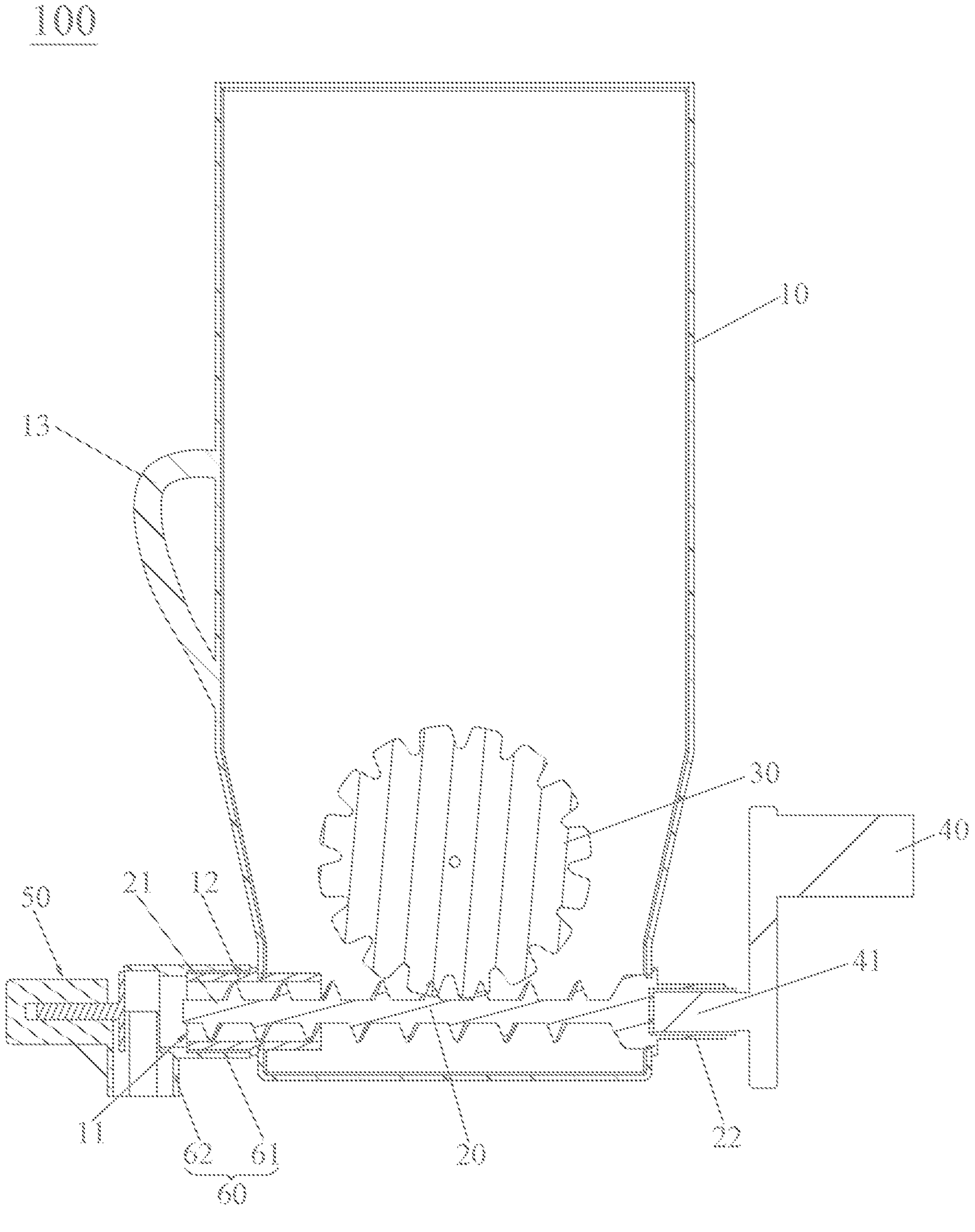
FIG. 9 is a cross section view of the powder feeding mechanism shown in FIG. 6 along a plane of the center line of the feeding screw.
Figure 10:
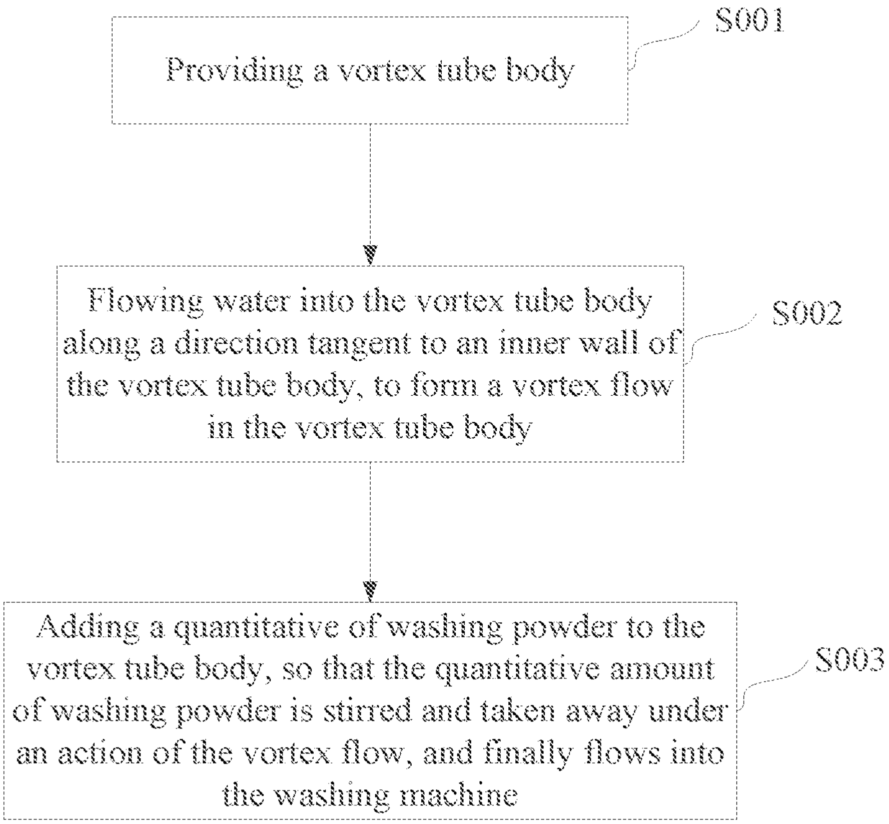
FIG. 10 is a flow chart of a washing powder feeding method according to one embodiment of the present invention.

As shown in FIGS. 7 and 9, a powder outlet pipe connector 12 is protruded from a lower side wall of the feed bin 10 and communicated with an interior of the feed bin 10, in which the powder outlet 11 is formed, and the first end 21 of the feeding screw 20 is located in the powder outlet pipe connector 12, so as to further ensure that the washing powders in the feed bin 10 can be reliably transferred to powder outlet pipe connector 12 by the feeding screw 20, and finally be discharged from the powder outlet 11. Preferably, in order to prevent the moist air from the outside entering the feed bin 10 from the powder outlet 11 and causing the washing powder in the feed bin 10 to regain moisture, as shown in FIGS. 6-9, the powder feeding mechanism 100 further includes a water pipe control valve 50 configured to control the opening and closing of the powder outlet 11. For further improving the transporting reliability of the washing powders, the powder feeding mechanism 100 further includes an L-shaped bent pipe connector 60, a first end 61 of the bent pipe connector 60 is sleeved on the powder outlet pipe connector 12, and a second end 62 of the bent pipe connector 60 is arranged downward to extend to the first cylindrical cavity 410, the electromagnetic control valve 50 is installed at the second end 62 of the bent pipe connector 60 and extended into the powder outlet pipe connector 12 along an axial direction (that is the arrow A and the opposite direction thereof) of the feeding screw 20. In such an arrangement, the feed bin 10 is replaceable, so that different washing powder may be selective by replacing the feed bin.

As shown in FIGS. 8 and 9, the second end 22 of the feeding screw 20 is mated with an output end 41 of the drive motor 40 in an insertion manner, in such a way, the drive motor 40 is detachable with the feeding screw 20, so that the feeding screw 20, the stirring gear 30, the powder outlet pipe connector 12, the bent pipe connector 60 and the electromagnetic control valve 50 in the feed bin 10 can be detached from the drive motor 40, which is more convenient for replacement operation of the feed bin 10. Specifically, in FIG. 8, the second end 22 of the feeding screw 21 is provided with convex teeth 221 arranged at intervals in a circumferential direction, and the output end 41 of the drive motor 40 is provided with grooves 411 that cooperate with the convex teeth 221. In such a configuration, on one hand, convenience of operation between the output end 41 of the drive motor 40 and the second end 22 of the feeding screw 20 is improved; on the other hand, relative rotation in the circumferential direction between the output end 41 of the drive motor 40 and the second end 22 of the feeding screw 20 is prevented. Alternatively, the convex teeth 221 may be arranged on the output end 41 of the drive motor 40, accordingly the grooves 411 may be arranged on the second end 22 of the p feeding screw 20, which is not limited however. Additionally, a handle 13 is provided on the feed bin 10, in order to facilitate the replacement of the feed bin 10. Preferably, the feed bin 10 has a square cross section taken at a plane perpendicular to the height direction of the feed bin 10. In order to accurately control the powder feeding amount, the driving motor 40 is a stepping motor preferably. It should be noted that the output end 41 of the drive motor 40 may be its own output shaft of the drive motor 40, or an intermediate shaft driven by the drive motor 40, and the output end 41 in this embodiment is an intermediate shaft, which is not limited however.

Figure 5:
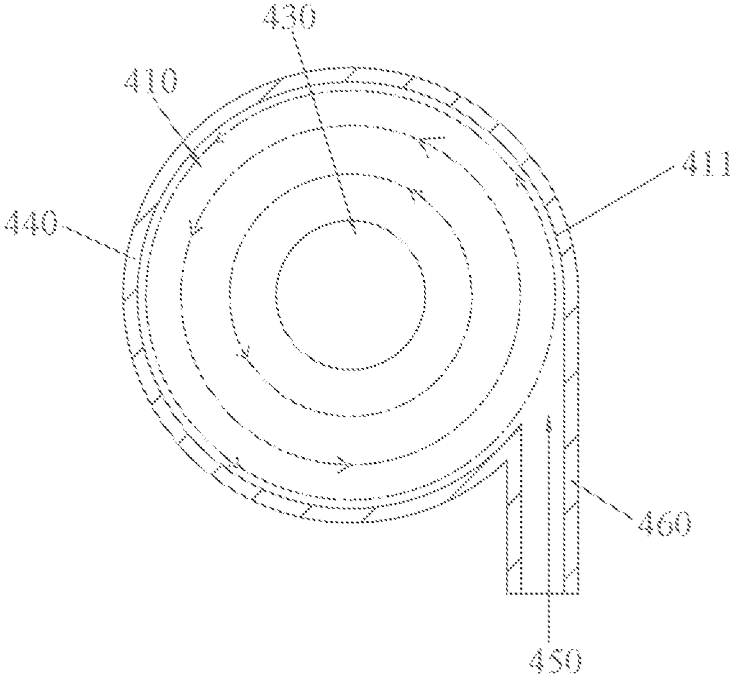
FIG. 5 is a cross section view of the vortex tube shown in FIG. 3 along a plane perpendicular to the center line and passing through the center of the water inlet.
Figure 6:
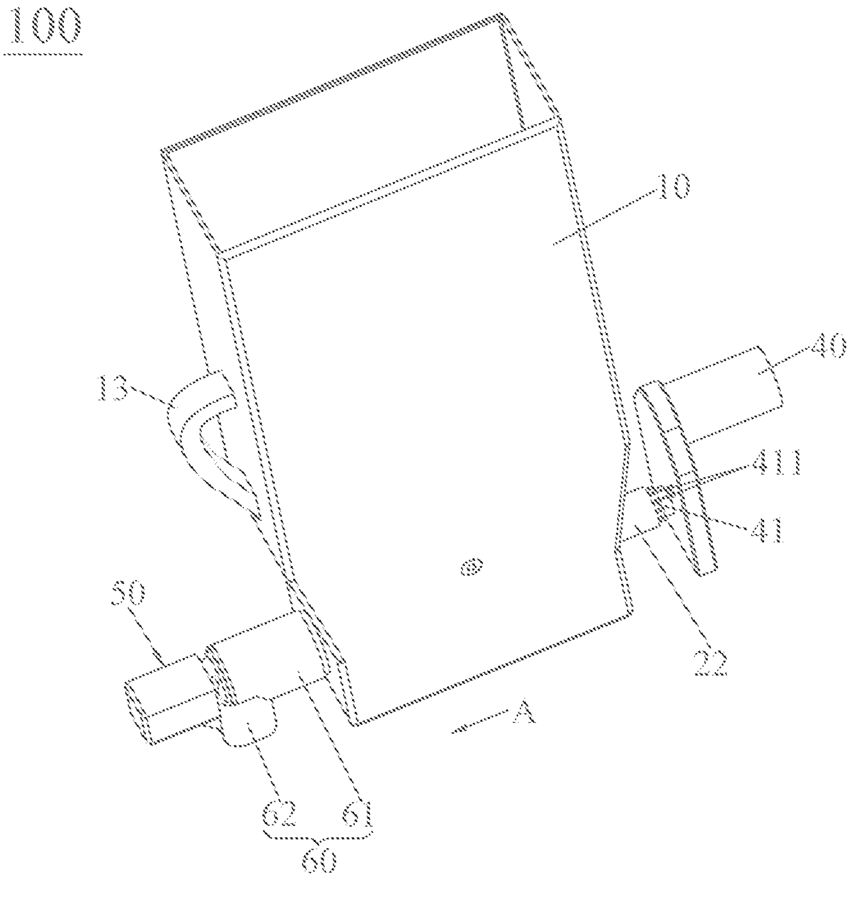
FIG. 6 is a perspective view of the powder feeding mechanism in the washing powder feeding device according to one embodiment of the present invention.

In comparison with the prior art, the interior of the vortex tube body 400 of the present invention is defined with a first cylindrical cavity 410, an intermediate truncated cone cavity 420, and a second cylindrical cavity 430 from top to bottom, the first cylindrical cavity 410 has a larger diameter than the second cylindrical cavity 430, and a water inlet 450 is formed on a side wall 440 of the vortex tube body 400 and communicated with and tangent to the first cylindrical cavity 410, the water pipe 300 is communicated with the water inlet 450. Based on the current configuration, a vortex will be formed inside the vortex tube body, as shown in FIG. 5. During the feeding process of the washing powder, water flows through the water inlet 450 and then flow into the first cylindrical cavity 410 in a tangent direction, additionally since the first cylindrical cavity 410 has a larger diameter than the second cylindrical cavity 430, therefore the water forms a vortex in the vortex tube body 400, and then the washing powder is fed into and the first cylindrical cavity 410 and then stirred and taken away under the action of the vortex, which effectively prevents the dissolved washing powder from adhering onto the pipeline to cause clogging of the pipeline, thereby ensuring the washing reliability. In addition, the washing powder feeding device 1000 of the present invention has simple structure.

It should be noted that the first cylindrical cavity 410, the second cylindrical cavity 430, and the intermediate truncated cone cavity 420 have a circular cross section along a plane perpendicular to the center line C. In addition, in order to make the washing machine feeding machine 1000 of the present invention more automatic, an existing controller may be electrically connected to control the coordination of various parts, such as coordination between water intake and powder addition.

Figure 4:
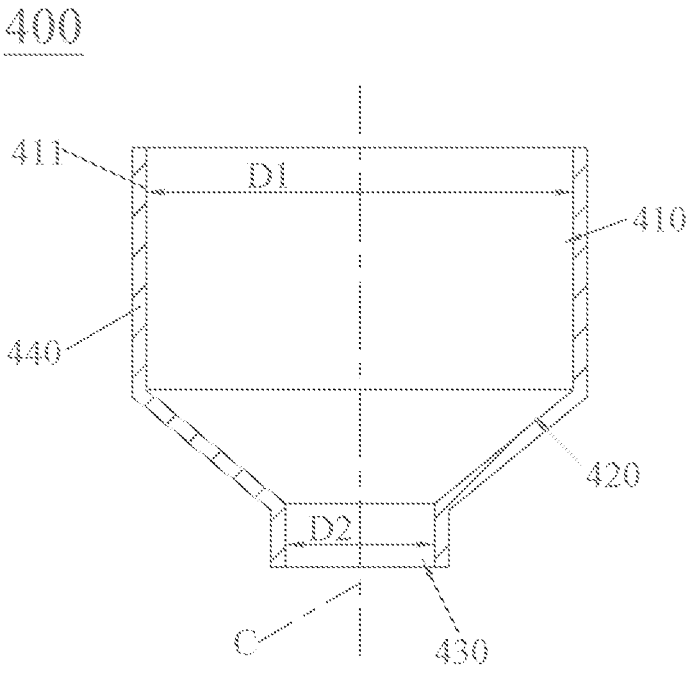
FIG. 4 is a cross section view of the vortex tube shown in FIG. 3 along a plane of the center line.

Combining with FIG. 10 and FIGS. 3-5 and 9, the washing powder feeding method of the present invention include the following steps:

S001, providing a vortex tube body; specifically, as shown in FIG. 4 the interior of the vortex tube body 400 is defined with a first cylindrical cavity 410, an intermediate truncated cone cavity 420 and a second cylindrical cavity 430 from top to bottom. Specifically, the diameter D1 of the first cylindrical cavity 410 is a larger than the diameter D2 of the second cylindrical cavity 430, the water inlet 450 is formed on the side wall 440 of the vortex tube body 400 and communicated with the first cylindrical cavity 410, and further the water inlet 450 is tangent to the cavity wall 411 of the first cylindrical cavity 410, as shown in FIG. 5. Preferably, the center lines C of the first cylindrical cavity 410, the intermediate truncated cone cavity 420, and the second cylindrical cavity 430 coincide, which is not limited.

S002, flowing water into the vortex tube body along a direction tangent to an inner wall of the vortex tube body, to form a vortex flow in the vortex tube body, as shown the center line of FIG. 5. Specifically, the water flows into the first cylindrical cavity 410 along a direction tangent to a cavity wall 411 of the first cylindrical cavity 410 to form a vortex flow in the vortex tube body 400, under a cooperation of the intermediate truncated cone cavity 420 and the second cylindrical cavity 430. It should be noted that, the water may be tap water or other flowing water.

S003, adding a quantitative of washing powder to the vortex tube body, so that the quantitative amount of washing powder is stirred and taken away under an action of the vortex flow, and finally flows into the washing machine. Specifically, in this step, a powder feeding mechanism 100 is configured to add the quantitative amount of washing powder to vortex tube body 400, so as to achieve the purpose of automatic powder. More specifically, the powder feeding mechanism 100 is further configured to stir the washing powder while adding the washing powder, thereby making the washing powder even and further improving the quantitative amount accuracy of the washing powder. For example, the powder feeding mechanism 100 includes a drive motor 40 for driving the feeding screw 20 to rotate in a stepwise manner to realize the quantitative addition of washing powder. Preferably, the feeding screw 20 is further to configured to rotate the stirring gear 30 while rotating in the above stepwise manner, so as to realize the coordination and synchronization of the both, thereby further improving the accuracy of the quantitative addition of washing powder. It is understandable that, in order to improve the level of automation, the working mode of the drive motor 40 can be set by the cooperation of the controller and the interface. For example, parameters such as the angle and time of each rotation of the drive motor 40 can be set through the interface and stored in the controller, in such a way, different ways of adding powder can be obtained by using different parameter combinations.

In comparison with the prior art, the water flows into the vortex tube body 40 in a direction tangent to the inner wall of the vortex tube body 40, to form a vortex the vortex tube body 40, and then a quantitative amount of washing powder is added to the vortex tube body 40 and then is stirred and taken away into the washing machine under the action of the vortex. By this token, under the strong pulling force of the vortex, the quantitative washing powder added to the vortex tube body 40 is fully stirred and flows into the washing machine, which effectively prevents the added washing powder from clogging the pipeline due to the viscosity of the washing powder when it is dissolved with water, thereby ensuring the reliability of washing.

It should be noted that the first cylindrical cavity 410, the second cylindrical cavity 420 and the intermediate truncated cavity 420 have a circular cross section along a plane perpendicular to the center line C.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A washing powder feeding device, comprising a frame, a water pipe, a powder feeding mechanism and a vortex tube body respectively assembled on the frame, wherein an interior of the vortex tube body is defined with a first cylindrical cavity, an intermediate truncated cone cavity and a second cylindrical cavity from top to bottom, the first cylindrical cavity has a larger diameter than the second cylindrical cavity, a water inlet is formed on a side wall of the vortex tube body and communicated with and tangent to the first cylindrical cavity, the water pipe is communicated with the water inlet, and the powder feeding mechanism is configured to feed washing powder into the first cylindrical cavity;

wherein the frame is a box structure in which the powder feeding mechanism, the vortex tube body and the water pipe are configured, one end of the water pipe is horizontally extended from the box structure, and the second cylindrical cavity of the vortex tube body is connected with a mixed flow pipe arranged in a vertical direction, which is extended from the bottom of the box structure.

2. The washing powder feeding device of claim 1, wherein a pipe connector is horizontally extended from and tangent to the side wall of the vortex tube body, and the pipe connector is assembled and connected with the water pipe.

3. The washing powder feeding device of claim 1, wherein center lines of the first cylindrical cavity, the intermediate truncated cone cavity, and the second cylindrical cavity coincide.

4. The washing powder feeding device of claim 1, further comprising a water pipe control valve built into the box structure and an interface located outside the box structure, wherein the interface is also assembled and connected with the box structure, and the water pipe control valve is configured to control the water pipe to open or close.

5. The washing powder feeding device of claim 1, wherein the powder feeding mechanism comprising a feed bin, a feeding screw, a stirring gear, and a drive motor for driving the feeding screw to rotate, the feeding screw is located in the feed bin, and a first end of the feeding screw is extended toward a powder outlet of the feed bin, the powder outlet is communicated with the first cylindrical cavity, a second end of the feeding screw is extended out of the feed bin, and the drive motor is located outside of the fee bin and assembled with the second end of the feeding screw, the stirring gear is rotatably installed in the feed bin and located directly above the feeding screw to engage with the feeding screw.

6. The washing powder feeding device of claim 5, wherein a powder outlet pipe connector is protruded from a lower side wall of the feed bin and communicated with an interior of the feed bin, in which the powder outlet is formed, and the first end of the feeding screw is located in the powder outlet pipe connector.

7. The washing powder feeding device of claim 5, wherein the second end of the feeding screw is mated with an output end of the drive motor in an insertion manner.

8. The washing powder feeding device of claim 7, wherein one of the second end of the feeding screw and the output end of the drive motor is provided with convex teeth arranged at intervals in a circumferential direction, and the other of the second end of the feeding screw and the output end of the drive motor is provided with grooves that cooperate with the convex teeth.

9. The washing powder feeding device of claim 6, wherein the powder feeding mechanism further comprises an electromagnetic control valve and an L-shaped bent pipe connector, a first end of the bent pipe connector is sleeved on the powder outlet pipe connector, and a second end of the bent pipe connector is arranged downward to extend to the first cylindrical cavity, the electromagnetic control valve is installed at the second end of the bent pipe connector and extended into the powder outlet pipe connector along an axial direction of the feeding screw, and the electromagnetic control valve is configured to selectively open or close the powder outlet.

10. A washing powder feeding method of the washing powder ding device according to claim 1, comprising steps of:

(1) providing the vortex tube body;

(2) flowing water into the vortex tube body along a direction tangent to an inner wall of the vortex tube body, to form a vortex flow in the vortex tube body; and (3) adding a quantitative of washing powder to the vortex tube body, so that the quantitative amount of washing powder is stirred and taken away under an action of the vortex flow, and finally flows into the washing machine.

11. The washing powder feeding method of claim 10, wherein an interior of the vortex tube body is defined with a first cylindrical cavity, an intermediate truncated cone cavity and a second cylindrical cavity from top to bottom, the first cylindrical cavity has a larger diameter than the second cylindrical cavity, a water inlet is formed on a side wall of the vortex tube body and communicated with and tangent to the first cylindrical cavity, the water flows into the first cylindrical cavity along a direction tangent to a cavity wall of the first cylindrical cavity to form a vortex flow in the vortex tube body, under a cooperation of the intermediate truncated cone cavity and the second cylindrical cavity.

12. The washing powder feeding method of claim 10, wherein in the step (3), a powder feeding mechanism is configured to add the quantitative amount of washing powder to vortex tube body.

13. The washing powder feeding method of claim 12, wherein the powder feeding mechanism is further configured to stir the washing powder while adding the washing powder.

14. The washing powder feeding method of claim 13, wherein the powder feeding mechanism comprises a feeding screw and a drive motor for rotating the feeding screw in a stepwise manner to add the washing powder.

15. The washing powder feeding method of claim 14, wherein the powder feeding mechanism further comprises a stirring gear for stirring the washing powder.

16. The washing powder feeding method of claim 15, wherein the feeding screw is engaged with stirring gear and configured to rotate in a stepwise manner and meanwhile drive the stirring gear.

17. The washing powder feeding method of claim 14, wherein a controller and an interface are configured and cooperated to set a working mode of the drive motor.

* * * * *